(12) United States Patent
Williams et al.

(10) Patent No.: US 6,469,634 B1
(45) Date of Patent: Oct. 22, 2002

(54) METHOD AND APPARATUS FOR CONTROLLING THE OPERATION OF ELECTRONIC ENTERTAINMENT DEVICES IN AN ENTERTAINMENT SYSTEM

(75) Inventors: Christopher D. Williams, Soquel; Michael L. Harvey, Danville; Gregory D. Buscheck, San Jose, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/584,285

(22) Filed: May 31, 2000

Related U.S. Application Data

(62) Division of application No. 08/866,708, filed on May 30, 1997
(60) Provisional application No. 60/018,905, filed on Jun. 3, 1996.

(51) Int. Cl.[7] ................................................. H04Q 1/00
(52) U.S. Cl. ................... 340/825.72; 359/159; 359/165
(58) Field of Search ........................ 340/825.69, 825.72, 340/825.25; 348/734; 359/159, 172, 110, 142, 165, 152

(56) References Cited

U.S. PATENT DOCUMENTS

| | | | |
|---|---|---|---|
| 4,703,359 A | | 10/1987 | Rumbolt et al. |
| 4,727,600 A | * | 2/1988 | Avakian ........................ 359/165 |
| 4,764,981 A | | 8/1988 | Miyahara ................. 340/825.69 |
| 4,771,283 A | | 9/1988 | Imoto ...................... 340/825.72 |
| 4,864,651 A | * | 9/1989 | Ogiwara ....................... 359/159 |
| 4,885,766 A | | 12/1989 | Yasuoka .................. 340/825.69 |
| 5,068,734 A | | 11/1991 | Beery |
| 5,151,789 A | * | 9/1992 | Young .................... 340/825.24 |
| 5,416,627 A | * | 5/1995 | Wilmoth ...................... 359/152 |
| 5,473,317 A | | 12/1995 | Inomata .................. 340/825.25 |
| 5,526,161 A | * | 6/1996 | Suzuki ......................... 359/159 |
| 5,528,391 A | | 6/1996 | Elrod ........................... 359/159 |
| 5,585,865 A | | 12/1996 | Amano et al. |
| 5,614,906 A | | 3/1997 | Hayes .................... 340/825.69 |
| 5,724,168 A | * | 3/1998 | Oschmann ................... 359/159 |
| 5,734,328 A | * | 3/1998 | Shinbori ...................... 359/159 |
| 5,777,768 A | * | 7/1998 | Korevaar ..................... 359/152 |
| 5,903,373 A | * | 5/1999 | Welch et al. ................ 359/152 |
| 5,909,296 A | * | 6/1999 | Tsacoyeanes ................ 359/159 |
| 5,959,754 A | * | 9/1999 | Sakurai ........................ 359/159 |
| 6,008,923 A | | 12/1999 | Samdahl ...................... 359/159 |

* cited by examiner

*Primary Examiner*—Brian Zimmerman
(74) *Attorney, Agent, or Firm*—Blakely, Sokoloff, Taylor & Zafman LLP

(57) ABSTRACT

A method and apparatus for controlling the operation of electronic entertainment devices in an entertainment system is described herein. A hardware system is coupled to a plurality of electronic entertainment devices to receive and transmit audio-video signals Transmit logic is coupled through a digital computer interface, preferably a SCSI interface, to the hardware system. The transmit logic has a plurality of ports and a memory associated with each port for storing control data sequences for each respective port. Each portis independently addressable by the hardware system A plurality of transmitters, each coupled to a respective one of the transmit logic ports transmits the respective store; control data sequences to respective ones of the electronic devices. In a preferred embodiment, the hardware system has a microprocessor, user interface and system memory and the transmitters are infrared light transmitters, one of which is a blaster transmitter for transmitting control data sequences simultaneously in multiple directions.

20 Claims, 4 Drawing Sheets

METHOD AND APPARATUS FOR CONTROLLING THE OPERATION OF ELECTRONIC ENTERTAINMENT DEVICES IN AN ENTERTAINMENT SYSTEM

CROSS-REFERENCE TO RELATED APPLICATIONS

This application is a divisional and claims the benefit of the priority of prior application Ser. No. 08/866,708, filed May 30, 1997, entitled "Method and Apparatus for Identifying Codes for Remotely Controlling Electronic Devices via a Wireless Communication," now abandoned, and claims the benefit of provisional application No. 60/018,905 filed Jun. 3, 1996

BACKGROUND OF THE INVENTION

1. Field of the Invention

The present invention pertains to remote control devices. More particularly, this invention relates to identifying codes for controlling electronic devices remotely.

2. Background

The controlling of electronic devices such as audio and video equipment via remote control s has become common practice. These remote controls typically transfer control codes to the electronic devices via infrared signals in order to activate various functions of the devices. However, manufacturers of electronic devices are able to define their own protocols as well as control codes for operation of their remote controls and devices, thereby requiring use of either their proprietary remote controls or the use of another remote control which knows the devices protocols and control codes. Thus, it would be beneficial to provide a single remote control device which is able to control multiple electronic devices without regard for the manufacturers of the electronic devices.

One solution to this problem is a user-programmable remote control. With a user programmable remote control, the user is able to manually input a particular code to the remote control which identifies the electronic device to the remote control. However, this solution requires the user to lookup the proper code in an instruction manual, and often times requires the user to manually enter multiple codes before the proper code is finally input. Thus, it would be beneficial to provide a way to reduce the amount of complexity and hassle on the part of a user in setting up control of different devices from a remote control.

Another solution to this problem is referred to as a "learning" remote control. Typically, a learning remote control learns the codes used by a particular manufacturer's remote control by having the user point the manufacturer's remote control at the learning remote control; press one of the buttons on the manufacturer's remote control, and then tell the learning remote control which button was pressed so that it can "learn" the code used by that manufacturer's remote control for that button. However, this learning process requires additional time and complexity for the user, as well as requires the availability of the original manufacturer's remote control in working order. Thus, it would be beneficial to provide a way to reduce the amount of complexity and hassle on the part of the user, as well as remove the need for the original manufacturer's remote control, in setting up control of different devices from a remote control.

Additionally, a current trend in the electronics and computer industry is the convergence of computers and electronic devices. This convergence is resulting towards more computer-controlled electronic devices, such as television sets. As this convergence continues, it will become more and more beneficial to provide an effective way to remotely control multiple electronic devices from a computer system. Given that such a computer control system will need to be set up to control the multiple electronic devices, it would be beneficial to provide a way for users to easily set up a control system to remotely control these electronic devices.

As will b described in more detail below, the present invention provides a method and apparatus for identifying codes for remotely controlling electronic devices via a wireless communication medium which achieves these and other desired results which will be apparent to those skilled in the art from the description that follows.

SUMMARY OF THE INVENTION

A method and apparatus for controlling the operation of electronic entertainment devices in an entertainment system is described herein. A hardware system is coupled to a plurality of electronic entertainment devices to receive and transmit audio-video signals Transmit logic is. coupled through a digital computer interface, preferably a SCSI interface, to the hardware system. The transmit logic has a plurality of ports and a memory associated with each port for storing control data sequences for each respective port. Each port is independently addressable by the hardware system A plurality of transmitters, each coupled to a respective one of the transmit logic ports transmits the respective stored control data sequences to respective ones of the electronic devices. In a preferred embodiment, the hardware system has a microprocessor, user interface and system memory and the transmitters are infrared light transmitters, one of which is a blaster transmitter for transmitting control data sequences simultaneously in multiple directions.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout,the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention is a method and apparatus for identifying codes for remotely controlling electronic devices via a wireless communication medium which reduces user inconvenience and complexity in identifying the codes. The present invention automatically identifies the proper code for controlling at least one function of each electronic device it is to be controlling. Additional codes can be identified by requesting user confirmation of a particular response by the electronic device, or alternatively can be identified automatically.

Figure 1:
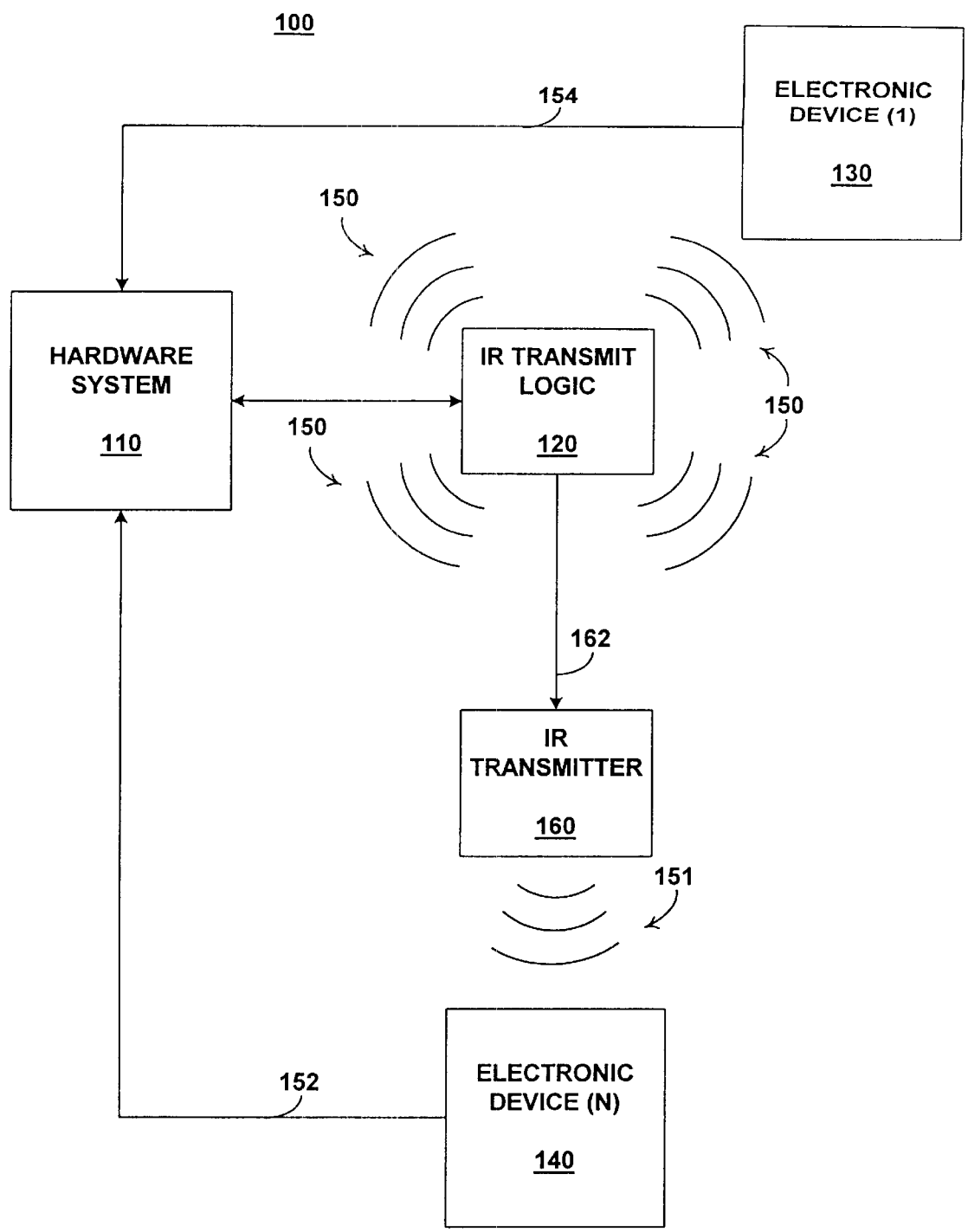
FIG. 1 Is a block diagram illustrating an entertainment system in which the present invention may be used.

FIG. 1 is a block diagram illustrating an entertainment system in which the present invention ay be used. An entertainment system 100 is illustrated including a hardware system 11, infrared (IR) transmit logic 120, IR transmitter 160, signal line 162, multiple electronic devices 130 and 140, IR signals 150, and feedback lines 152 and 154. Hardware system 110 controls the identifying and storage of control codes for electronic device, 130 and 140. During the identifying process, hardware system 110 forwards control codes to IR transmit logic 120, which in turn transmits the codes to the electronic device 130 and 140 via IR signals 150. In one embodiment, hardware system 110 is coupled to IR transmit logic 120 via a conventional RS-232C interface. When electronic device 130 receives an IR signal which activates a particular function in electronic device 130, then the occurrence of this function is indicated to hardware system 110 via feedback line 154. Similarly, when electronic device 140 receives an IR signal which activates a particular function in electronic device 140, then the occurrence of this function is! indicated to hardware system 110 via feedback line 152. The exact nature of these indications on feedback lines 152 and 154 is dependent on the functions as discussed in more detail below. In alternate embodiments, feedback lines 152 and 154 are input to IR transmit logic 120 rather than hardware system 110.

Entertainment system 100 illustrates the convergence of computers and electronic devices. After identifying one or more codes in accordance with the present invention, hardware system 10 is able to remotely control electronic devices 130 and 140 via IR signals 150 and or 151. It should be noted that hardware system 110 represents a wide range of hardware devices which could be used to control electronic devices 130 and 140, and it is to be appreciated that the size of the housing of hardware system 110 can vary based on the amount of internal circuitry which is included in hardware system 110.

Electronic devices 130 and 140 may be any of a wide variety of conventional, commercially available electronic devices. Examples of these electronic devices include audio components such as receivers, amplifiers, compact disk (CD) players, and audio cassette players and video components such as video cassette recorders (VCRs), digital versatile disk (DVD) recorders/players, laser disk players, televisions, video cameras, digital cameras cable boxes, and satellite boxes for use with satellite dish systems. In one embodiment, the electronic devices are consumer electronic devices which would typically be use in a consumer's entertainment (audio and/or video) system. However, in alternate embodiments, the electronic devices may be of a commercial or professional nature. The "functions" of an electronic device refers to the operations which the electronic device can be ordered to perform. Examples of these functions include: power on, power off, play, stop, pause, rewind, fast forward, record, TV/video select, entry of numbers 0–9, enter, recall, volume up/down, channel/station selection up/down, video controls such as sharpness, contrast, and brightness, source selection controls such as video 1, video 2, CD, and receiver, and additional audio controls such as surround sound processing types (including Dolby™ Surround, Dolby™ Digital, Dolby™ Surround Pro Logic, Dolby™ 3 Stereo, and THX™), various surround sound processing modes (including number of channels, and type of sound environment to emulate, such as concert hall, rock concert, movie theater, etc.), stereo mode, and mono mode. It is to be appreciated that the specific functions which each electronic device can perform are dependent on the particular device. By way of example, given that laser disks typically cannot be written to, a typical laser disk player would be capable of various functions including power on and power off functions, but would not have a record function.

The indications on feedback lines 152 and 154 are dependent on both the function which is performed and the type of electronic device which performs the function. Additionally, it is to be appreciated that the nature of the connections of electronic devices to feedback lines 152 and 154 is dependent on both the function which is performed and the type of electronic device which performs the function. By way of example, electronic device 130 may be a VCR in the powered off state and feedback line 154 a video output signal from electronic device 130. Thus, if hardware system 110 is in the process of identifying the control code which activates the power on function of electronic device 130, hardware system 110 can monitor the feedback line 154 for a video signal. If no video signal is received from electronic device 130 in response to a particular code, then hardware system 110 knows it tried an incorrect code for the power on function. However, if a video signal is received in response to a particular code, then hardware system 110 knows it has a correct code for the power on function of electronic device 130.

It is to be appreciated that additional functions besides power on can be detected. By way of example, a conventional power sensing device could be placed in the power line of an electronic device (such as between the wall socket and the plug of the electronic device). This device could monitor the power drain of the electronic device, and thereby indicate to hardware system 110 that a particular function had occurred (such as play, rewind, channel change, etc.). By way of another example, light sensors could be placed in front of control lights or channel/station display lights on an electronic device and input to the hardware system, thereby allowing hardware system 110 to detect specific functions by the on/off status of these various lights. Yet another example is to use audio sensors (e.g., a microphone) at hardware system 110. Hardware system 110 could use these audio sensors to detect changes in noise level, such as would occur as a result of power on/power off of a receiver, activating the play function of a CD player, volume control adjustments to an electronic device, etc.

In one embodiment of the present invention, the control codes transmitted to electronic devices 130 and 140 via IR transmit logic 120 vary in both their protocol and their data. The protocol for the code refers to the way in which the code is transferred, including carrier frequency and duty cycle for the transmission, bit modulation scheme for the transmission, the number of cycles transmitted in data bursts, and the delay between data bursts. The data for the code refers to the data which identifies a particular function of the electronic device. It is to be appreciated that both the protocol and the data can vary by manufacturer.

In the illustrated embodiment, hardware system 110 selects the manufacturer for the code to be transmitted and forwards this manufacturer information to IR transmit logic 120 along with the data to be transmitted. IR transmit logic 120 is pre-programmed with the protocols used by the various manufacturers. IR transmit logic 120, upon receipt of the manufacturer information and data from hardware system 110, identifies the protocol to use for the manufacturer and transmits the data to the electronic device(s) using that protocol. In an alternate embodiment, hardware system 110 is pre-programmed with, the protocols and sends both the protocol information and the data to the IR transmit logic 120, thereby alleviating IR transmit logic 120 of the need to maintain and lookup manufacturer protocol information.

In one embodiment, IR transmit logic 120 maintains storage slots for eight different protocols. In this embodiment, if hardware system 110 needs to use a different protocol than any stored in IR transmit logic 120, hardware system 110 loads the protocol into IR transmit logic 120, overwriting a previous protocol if necessary. In one implementation, these eight different protocols are linked to the eight different ports, thereby allowing IR transmit logic 120 to identify the proper protocol based on which port the data is to be transmitted over, or vice versa.

In the illustrated embodiment, IR transmit logic 120 includes six conventional infrared transmitter amplifiers and light emitting diodes (LEDs) (not shown) which are used to transmit the IR signals in a conventional manner. In one implementation, each of the six LEDs transmits an IR signal in at least a 60 degree cone with the apex at the LED. Thus, by placing the LEDs in a circular pattern, separating each by 60 degrees, the IR signals 150 can be transmitted in a full circle pattern from the transmit logic 120.

In the illustrated embodiment, line 162 provides a wired connection from IR transmitter 160 to IR transmit logic 120. The internal circuitry of IR transmit logic 120 can control the IR transmitter amplifiers and the LEDs in IR transmit logic 120 to transmit IR signals, or alternatively can forward the control information to IR transmitter 160 via line 162 to allow IR transmitter 160 to transmit IR signals 151. In the illustrated embodiment, IR transmitter 160 includes a single LED for transmitting signals to electronic device 40. The additional IR transmitter 160 allows the signal to be directed to a particular one or more electronic devices. This allows specific signals to be sent to a particular electronic device if multiple electronic devices use the same codes, or alternatively if one or more of the electronic devices are not within the range of IR signals 150. It is to be appreciated that in alternate embodiments, IR transmitter 160 may include multiple IR transmitter amplifiers and LEDs to provide a broader signal path for IR signals 151.

In the illustrated embodiment, IR transmit logic 120 includes eight output ports for IR signals. Seven of these output ports are for wired connections, allowing additional IR transmitters 160 to be coupled to IR transmit logic 120 via additional lines 162. The eighth output port, referred to as the "blaster" port, forwards signals to the six LEDs of transmit logic 120, allowing IR signals 150 to be transmitted. As discussed in more detail below, these eight ports can be individually addressed by hardware system 110, thereby allowing hardware system 110 to control where the IR signals are transmitted.

The use of IR transmitter amplifiers, LEDs, and selection circuitry as used within IR transmit logic, 120 is well-known to those skilled in the art and thus will not be discussed further except as it relates to the present invention.

It is to be appreciated that the number of ports in IR transmit logic 120 can be increased or decreased, that the number of wired ports can be increased or decreased, and that the number of blaster ports can be increased or decreased. The number of ports which IR transmit logic 120 should include can be identified by balancing the total number of ports needed to control the desired number of electronic devices and the increased size and cost of providing additional ports.

It is to be appreciated that although hardware system 110 and IR transmit logic 120 are illustrated as two separate devices in FIG. 1, these two components may be combined. For example, a computer system may include IR transmit logic 120 on a printed circuit board within the computer system's housing.

It is also to be appreciated that although the entertainment system 100 is illustrated as transmitting signals to the electronic devices via IR signals, any of a wide range of communication media may be used. It is to be appreciated that the IR transmitter could send signals to the electronic devices via any wireless communication medium.

In one embodiment of the present invention, hardware system 110 communicates with IR transmit logic 120 using a serial stream including a command start indication, a command type indication, data, and a check sum. The command start indication is a predetermined code to indicate that a command is about to begin. The command type indication is one of a set of predetermined codes which identifies a particular command. In one implementation, six command types are supported: load temporary protocol, save temporary protocol send infrared (which includes the control code to be sent, an identifier of the protocol to use, and the port over which the data is to be sent), wait (which indicates an amount of delay which should occur between successive infrared commands), test, End system reset. The data is the particular control code being transmitted to the electronic device(s). The check sum is a well-known method for verifying the accuracy of data being transmitted.

It is to be appreciated that additional types of error checking and additional components of the serial stream could be included in alternate embodiments of the present invention.

In one embodiment of the present invention, records are used to store the control codes for the electronic devices.

These records for each of multiple commercially available electronic devices can be supplied to the hardware system in any of a wide variety of conventional manners, such as by dial-up access to a bulletin board system (BBS), access over the Internet, provision of a non-volatile storage device such as a magnetic or optical disk, etc.

In one embodiment, hardware system 110 maintains a different record for each of the electronic devices which is part of the entertainment system 100. In one embodiment, the data stored for each electronic device includes codes identifying each of the functions of the device which can be controlled remotely by the infrared signals, as well as an identifier of the protocol used by the electronic device and an address of the electronic device (which indicates to the electronic device, upon receipt of an IR signal, that the IR signal targets the electronic device).

In one embodiment, in addition to the records stored for electronic devices, hardware system 10 also maintains a record of manufacturers and corresponding protocol identifiers. Thus, if hardware system 110 receives an input (e.g., from a user) which identifies a particular manufacturer for an electronic device, hardware system 110 can identify the proper protocol to be used with the electronic device.

Figure 2:
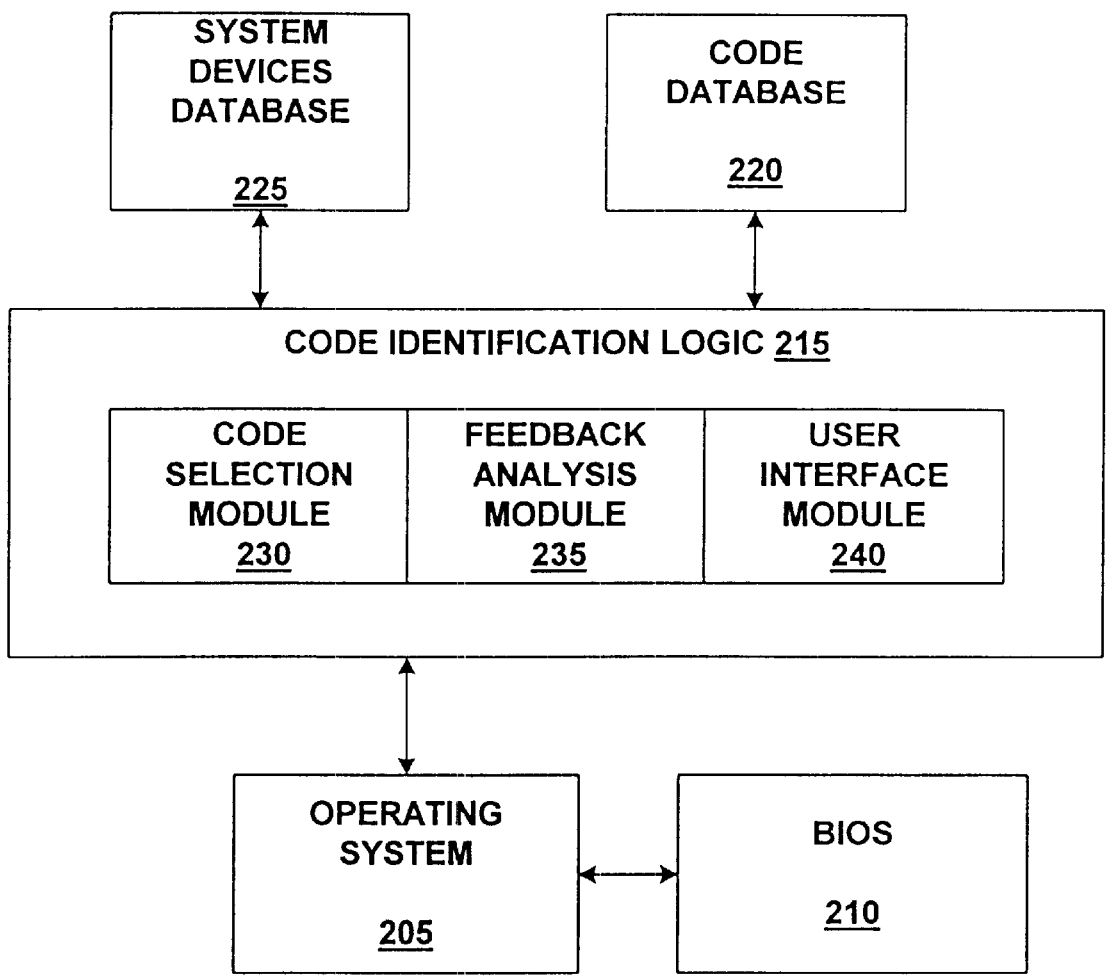
FIG. 2 is a simplified block diagram illustrating the system architecture of a hardware system according to one embodiment of the present invention.

FIG. 2 is a simplified block diagram illustrating the system architecture of a hardware system according to one embodiment of the present invention. As shown, the hardware system includes operating system 205, basic input/output system (BIOS) 210, code identification logic 215, code database 220, system devices database 225, code selection module 230, feedback analysis module 235, and user interface module 240.

BIOS 210 provides an interface between operating system 205 and the various input/output (SO) devices coupled to the hardware system.

Operating system 205 is a software service which provides an interface between BIOS 210 and code identification logic 215 as well as other software applications executing on the hardware system. Operating system 205 provides an interface, such as a graphical user interface (GUI), between the user and the hardware system. According to one embodiment of the present invention, operating system 205 is the Windows™ 95 operating system, available from Microsoft Corporation of Redmond, Washington. However, it is to be appreciated that the present invention may be used with any other conventional operating system, such as other versions of Microsoft Windows™ (for example, Windows™ 3.0, Windows™ 3.1, or Windows™ NT), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, or, the UNIX operating system, available from Santa Cruz Operations of Santa Cruz, Calif.

Code identification logic 215 controls the process for identifying codes to control electronic devices 130 and 140 as discussed in more detail below. Code database 220 is a database of electronic devices and corresponding codes. In one implementation, code database 220 includes codes to control all functions of a plurality of makes and models of electronic devices. System device database 225 is a database of electronic devices which are part of entertainment system 100. System device database 225 is updated by code identification module with the codes to control the various functions of the electronic devices, as discussed in more detail below.

Code selection module 230 controls the selection of which code to try for a particular electronic device. That is, which code may work for a particular function of the electronic device.

Feedback analysis module 235 compares the response, if any, of the electronic device to a particular code signal to the response which the hardware system expects. In other words, feedback analysis module 235 compares the received response, if any, to the response which the selected code should have elicited if the selected code were the correct code for the function being tried.

User interface module 240 provides a user interface between code identification logic 215 and a user of hardware system 110. User interface module 240 allows a user to identify a particular make of an electronic device, or respond to prompts from the hardware system, as discussed in more detail below. In one embodiment, user interface module 240 provides a graphical user interface, such as one or more windows, to provide information to the user and receive inputs from the user.

Figure 3:
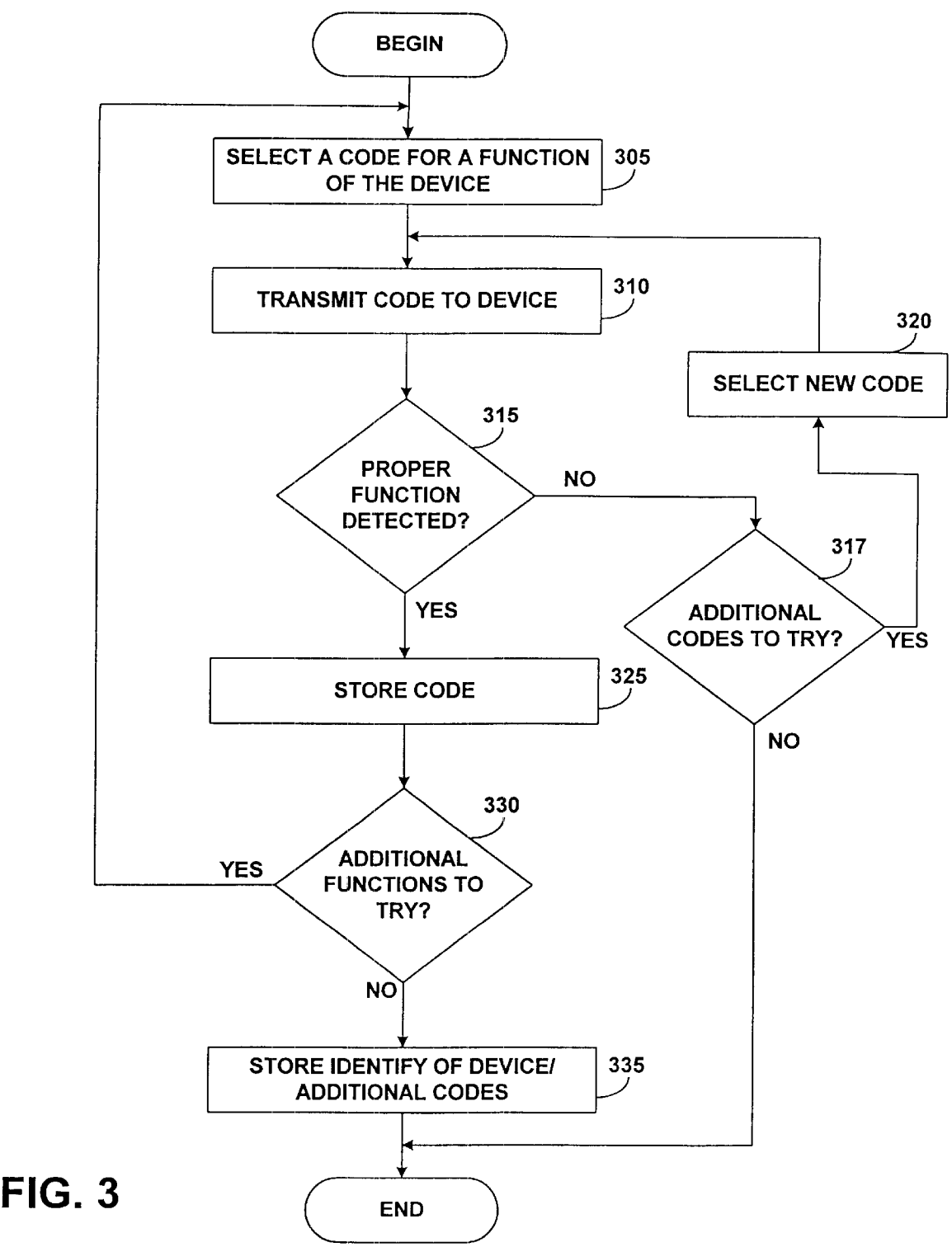
FIG. 3 is a flowchart illustrating the steps followed in identifying control codes for an electronic device according to one embodiment of the present invention.

FIG. 3 is a flowchart illustrating the steps followed in identifying control codes for an electronic device according to one embodiment of the present invention. The code selection module 230 first selects a code which may control a function of one of the electronic devices, step 305. Code identification logic 215 then transmits the selected code to the electronic device via IR transmit logic 120, step 310. Feedback analysis module 235 then checks whether activation of the function was detected based on the signal(s) received via the feedback line(s), if any, from the device, step 315.

If the hardware system does not detect the activation of the function, then code selection module 230 checks whether there are additional codes to be tried for the function, step 3171 If there are additional codes, then a new code is selected, step 320, and subsequently transmitted to the device. However, if there are no additional codes to be tried, then the; process ends due to none of the codes working for the desired function. In an alternate embodiment, rather than ending, code selection module 230 initiates an access to a remote location to retrieve an updated set of codes. Upon obtaining an updated set of codes, the hardware system returns to step 305 to repeat the steps of FIG. 3 using the updated set of codes. In one implementation, code selection module 230 obtains the set of updated codes by accessing a remote server using a conventional "dial-up" connection. In another implementation, code selection module 230 accesses a remote server via the Internet to obtain the updated set of codes.

Returning to step 315, if activation of the function is detected then code identification logic 215 stores the selected code, step 325. Code identification logic 215 then checks whether there are additional functions to try, step 330. In one embodiment, code identification logic 215 performs this check by checking whether the selected code (s) so far uniquely identify an electronic device in code database 220. If the selected code(s) do uniquely identify one electronic device, then no further checking is necessary as the hardware system knows the identity of the electronic device. In an alternate embodiment, additional checking of additional codes for additional functions is made to verify that the first code worked properly.

If there are additional functions to try, then code identification logic 215 returns to step 305 to select a code which may work for another function of the electronic device.

However, if there are not additional functions to try, then code identification logic 215 proceeds to store the identity of the newly identified device, step 335, and optionally to store additional codes for the device. To store additional codes for the device, code identification logic 215 accesses the records of code database 220 and copies the codes for the newly identified device into a new record of system device database 225.

According to one embodiment of the present invention, the method of the present invention begins transmitting IR signals via the blaster port, thereby sending signals to all of the devices within range of IR transmit logic 120 via IR signals 150 of FIG. 1. If the hardware system IS unsuccessful in detecting the proper function from the electronic device being set up, then the hardware system repeats the steps of FIG. 3 using one of the other ports providing a wired connection to an IR transmitter 160. Alternatively, the hardware system may receive an input from a user which identifies which port the signals for a particular electronic device should be transmitted over.

In the illustrated embodiment, in step 305 code selection module 230 selects codes for the particular function from different records in code database 220. The selection of which record's code for the function is to be tried can be performed in any of a wide range of manners. In one implementation, code selection module 230 steps through the records one by one in the order they were stored in code database 220. In another implementation, the selection of records is based on a random number generator. In another implementation, code selection module is pre-programmed with a particular ordering of manufacturers, thereby causing the selection module to follow this pre-programmed order. This allows code selection module 230 to be programmed to test the most common electronic devices first.

Additionally, in one embodiment of the present invention, code identification logic 215 can receive data input from a user via user interface module 240. This data input may assist code selection module 230 in selecting codes to try. By way of example, code identification logic 215 may receive as an input from the user the manufacturer of a particular electronic device. Based on this input, code selection module 230 could select only those codes which correspond to the identified manufacturer. It is to be appreciated that a user could input this information in any of a wide variety of conventional manners, such as by selecting a manufacturer from a list provided by the code identification logic, or by typing in the manufacturer name. Other types of input which code identification logic 215 may receive include full or partial model numbers, and electronic device type. In an alternate embodiment, the selection of the codes by code selection module 230 is done fully automatically without any user identification of manufacturer, model, device type, etc.

It is to be appreciated that the present invention can be used with any of a wide variety of conventional electronic devices without requiring additional circuitry in the electronic devices. A hardware system which incorporates the present invention changes the codes to be transmitted to an electronic device, however the response to these codes by the electronic devices is no different than the response that would be obtained from a conventional remote control. That is, if the proper code is transmitted to the electronic device, then it will perform the indicated function; otherwise, it will not respond to the code. Therefore, no additional logic in or modifications to the electronic devices are necessary.

Figure 4:
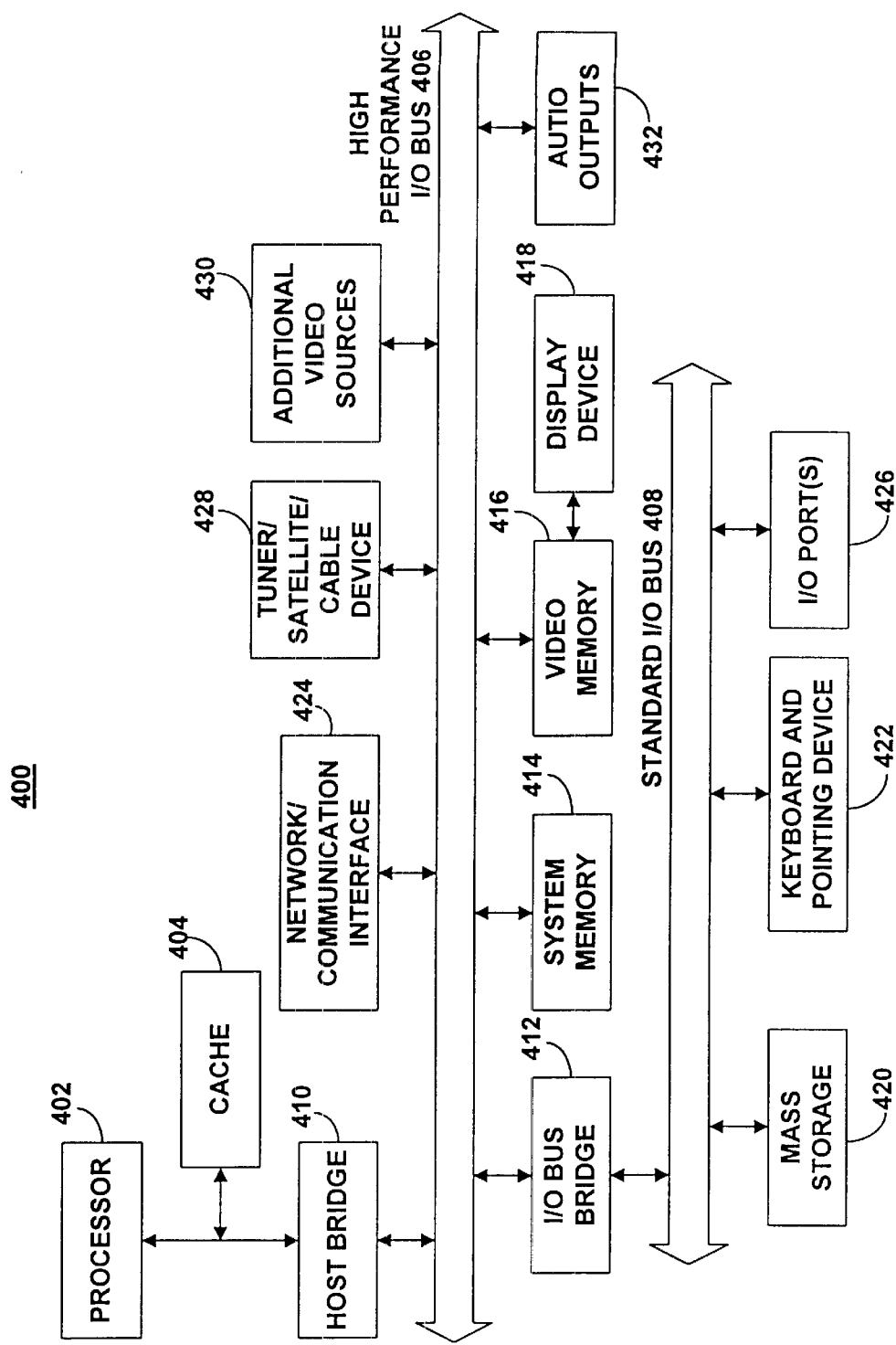
FIG. 4 illustrates one embodiment of a hardware system suitable for use with the present invention.

FIG. 4 illustrates one embodiment of a hardware system suitable for use with the present invention. In one embodiment, the hardware system 1 0 illustrated in FIG. 1 is a hardware system 400 of FIG. 4. In the illustrated embodiment, hardware system 400 includes processor 402 and cache memory 404 coupled to each other as shown. Additionally, hardware system 400 includes high performance input/output (I/O) bus 406 and standard I/O bus 408. Host bridge 410 couples processor 402 to high performance I/O bus 406, whereas I/O bus bridge 412 couples the two buses 406 and 408 to each other. Coupled to bus 406 are network/communication interface 424, system memory 414, and video memory 416. In turn, display device 418 is coupled to video memory 416. Coupled to bus 408 is mass storage 420, keyboard and pointing device 422, and I/O ports 426. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 406. As illustrated, analog tuner/digital satellite/cable devices 428, additional video sources 430, and audio outputs 432 are also coupled to high performance I/O bus 406.

These elements 402–432 perform their conventional functions known in the art. In particular, network/communication interface 424 is used to provide communication between system 400 and any of a wide range of conventional networks, such as an Ethernet, token ring, the Internet, etc. It is to be appreciated that the circuitry of interface 424 is dependent on the type of network the system 400 is being coupled to.

Mass storage 420 is used to provide permanent storage for the data and programming instructions to implement the above described functions, whereas system memory 414 is used to provide temporary storage for the data and programming instructions when executed by processor 402. I/O ports 426 are one or more serial and/or parallel communication ports used to provide communication between additional peripheral devices which may be coupled to hardware system 400.

It is to be appreciated that various components of hardware system 400 may be rearranged. For example, cache 404 may be on-chip with processor 402. Alternatively, cache 404 and processor 402 may be packed together as a "processor module", with processor 402 being referred to as the "processor core". Furthermore, certain implementations of the present invention may not require nor include all of the above components. For example, mass storage 420, keyboard and pointing device 422, and/or display device 418 and video memory 416 may not be included in system 400. Additionally, the peripheral devices shown coupled to standard I/O bus 408 may be coupled to high performance I/O bus 406; in addition, in some implementations only a single bus may exist with the components of hardware system 400 being coupled to the single bus. Furthermore, additional components may be included in system 400, such as additional processors, storage devices, or memories. It is also to be appreciated that IR transmit logic 120, of FIG. 1 may be part of system 400 and be coupled to either bus high performance I/O bus 406 or standard I/O bus 408.

In one embodiment, the method for identifying codes for remotely controlling electronic devices via a wireless communication medium according to the present invention as discussed above is implemented as a series of software routines run by hardware system 400 of FIG. 4. These software routines comprise a plurality or series of instructions to be executed by a processor in a hardware system, such as processor 402 of FIG. 4. Initially, the series of instructions are stored on a storage device, such as mass storage 420. It is to be appreciated that the series of instructions can be stored on any conventional storage device, such as a diskette, CD-ROM, magnetic tape, digital versatile disk (DYD), laser disk, ROM, Flash memory, etc. It is also to be appreciated that the series of instructions need not be stored locally, and could be received from a remote storage device, such as a server on a network, via network/communication interface 424.

The instructions are copied from the storage device, such as mass storage 420, into memory 414 and then accessed and executed by processor 402. In one implementation! these software routines are written in the C++programming language. It is to be appreciated, however, that these routines may be implemented in any of a wide variety of programming languages. In alternate embodiments, the present invention is implemented in discrete hardware or firmware. For example, an application specific integrated circuit (ASIC) could be programmed with the above described functions of the present invention.

Thus, a method and apparatus for identifying codes for remotely controlling electronic devices via a wireless communication medium has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. An apparatus for controlling the operation of electronic entertainment devices in an entertainment system comprising:
    a hardware system coupled to a plurality of electronic entertainment devices to receive audio-video signals;
    transmit logic coupled to the hardware system, the transmit logic having a plurality of ports and a storage slot associated with each port to store control code protocols for each respective port, the ports being linked to the respective control code protocols to allow the transmit logic to identify a control data sequence based on the linked port, each port being independently addressable by the hardware system;
    a plurality of transmitters, each coupled to a respective one of the transmit logic ports, to transmit the respective stored control code protocols to respective ones of the electronic devices.

2. The apparatus of claim 1 wherein the hardware system further comprises a microprocessor, user interface and system memory.

3. The apparatus of claim 1 wherein the transmitters comprise infrared light transmitters.

4. The apparatus of claim 1 wherein at least one of the transmitters comprises a blaster transmitter to transmit control code protocols simultaneously in multiple directions.

5. The apparatus of claim 1 wherein the hardware system is coupled to the transmit logic through a digital computer interface.

6. The apparatus of claim 5 wherein the digital computer interface comprises a serial data stream having a command start portion, a command type portion and check sum portion, the commands including load control data sequence, transmit control data sequence, system test and reset.

7. The apparatus of claim 1 wherein the hardware system comprises an identification register to maintain a record of each of the electronic devices of the entertainment system, each record identifying control code protocols and an output port of the transmit logic for each device.

8. The apparatus of claim 1 wherein the hardware system comprises a record of electronic device manufacturers and corresponding control data protocols applicable for remote control of the corresponding electronic device.

9. The apparatus of claim 1 wherein the hardware system comprises a feedback analysis module to compare an expected response to a response received from an electronic device in response to the control data sequence transmitted to the electronic device.

10. The apparatus of claim 9 wherein the hardware system comprises code identification logic coupled to the feedback analysis module to store an identification in an identification register in response to an indication from the feedback analysis module.

11. The apparatus of claim 1 wherein the control code protocols comprise one or more ,of power on, power off, play, stop, pause, rewind, record, volume up/down, station selection and source selection.

12. An apparatus for controlling the operation of electronic entertainment devices in an entertainment system comprising:
    system means coupled to a plurality of electronic entertainment devices for receiving audio-video signals;
    logic means for storing control code protocols in a storage slot means for each of a plurality of ports, a storage slot means being associated with each port to store control code protocols for each respective port, the ports being linked to the respective control code protocols to allow the logic means to identify a control data sequence based on the linked port, the logic means being coupled to the system means, each of the plurality of ports being independently addressable by the system means;
    a plurality of means for transmitting the respective stored control code protocols to respective ones of the electronic devices, each transmitting means being coupled to a respective one of the ports.

13. The apparatus of claim 12 wherein at least one of the plurality of transmitting means comprises means for transmitting control code protocols simultaneously in multiple directions.

14. The apparatus of claim 12 wherein the logic means is coupled to the system means through a digital computer interface and wherein the digital computer interface comprises means for communicating a serial data stream having a command start portion, a command type portion and check sum portion, the commands including load control data sequence, transmit control data sequence, system test and reset.

15. The apparatus of claim 12 wherein the system means comprises means for maintaining record of each of the electronic devices of the entertainment system, each record identifying control code protocols and an output port of the logic means for each device.

16. The apparatus of claim 12 wherein the system means comprises means for comparing an expected response to a response received from an electronic device in response to the control data sequence transmitted to the electronic device.

17. The apparatus of claim 16 wherein the system means comprises means coupled to the comparing means for storing an identification in response to an indication from the comparing means.

18. An entertainment system controller comprising:

a high performance input/output bus coupled to feedback lines of a plurality of electronic entertainment devices of an entertainment system to receive audio-video signals over the feedback lines;

transmit logic coupled to the high performance input/output bus, the transmit logic having a plurality of storage slots to store control code protocols and a port associated with each storage slot, the ports being linked to the respective storage slot to allow the transmit logic to identify a control data sequence by addressing the linked port, the control code protocols being to activate respective functions in entertainment devices upon receipt by the respective entertainment device;

a plurality of transmitters, each coupled to a respective one of the transmit logic ports, to transmit the respective stored control code protocols to respective ones of the electronic devices;

a feedback analysis module to detect activation of an expected function by an electronic device over a respective feedback line in response to the control data sequence transmitted to the electronic device; and code identification logic coupled to the feedback analysis module to store a control data sequence in response to an indication from the feedback analysis module that an expected function is activated.

19. The controller of claim 18 further comprising an identification register coupled to the code identification logic to maintain a record of each of the electronic devices of the entertainment system, each record identifying control code protocols and an output port of the transmit logic for each device.

20. The controller of claim 18 wherein the code identification logic is further to select a second control data sequence to activate a second function of the entertainment device in response to an indication from the feedback analysis module that an expected function is activated, the code identification logic being coupled to the transmit logic so that the second control data sequence is transmitted to the entertainment device and the feedback analysis module checks for activation of the second function.

* * * * *

UNITED STATES PATENT AND TRADEMARK OFFICE
CERTIFICATE OF CORRECTION

PATENT NO. : 6,469,634 B1
DATED : October 22, 2002
INVENTOR(S) : Williams et al.

It is certified that error appears in the above-identified patent and that said Letters Patent is hereby corrected as shown below:

<u>Column 1,</u>
Line 32, delete "devices", insert -- devices' --.

<u>Column 3,</u>
Line 38, delete "ay", insert -- may --.
Line 40, delete "11", insert -- 110 --.
Lines 44 and 47, delete "device", insert -- devices --.
Line 56, delete "is!", insert -- is --.
Line 65, delete "10", insert -- 110 --.

<u>Column 4,</u>
Line 16, delete "use", insert -- used --.

<u>Column 5,</u>
Line 66, delete "40", insert -- 140 --.

<u>Column 6,</u>
Line 58, delete "End", insert -- and --.

<u>Column 7,</u>
Line 18, delete "10", insert -- 110 --.
Line 34, delete "(SO)", insert -- (I/O) --.

<u>Column 9,</u>
Line 13, delete "IS", insert -- is --.

<u>Column 10,</u>
Line 1, delete "1 0", insert -- 110 --.

UNITED STATES PATENT AND TRADEMARK OFFICE
CERTIFICATE OF CORRECTION

PATENT NO.   : 6,469,634 B1
DATED        : October 22, 2002
INVENTOR(S)  : Williams et al.

It is certified that error appears in the above-identified patent and that said Letters Patent is hereby corrected as shown below:

Column 11,
Line 8, delete "(DYD)", insert -- (DVD) --.

Signed and Sealed this

Twenty-second Day of July, 2003

JAMES E. ROGAN
*Director of the United States Patent and Trademark Office*